A. Canfield.
Cultivator.
N°67,843.   Patented Aug. 20, 1867.
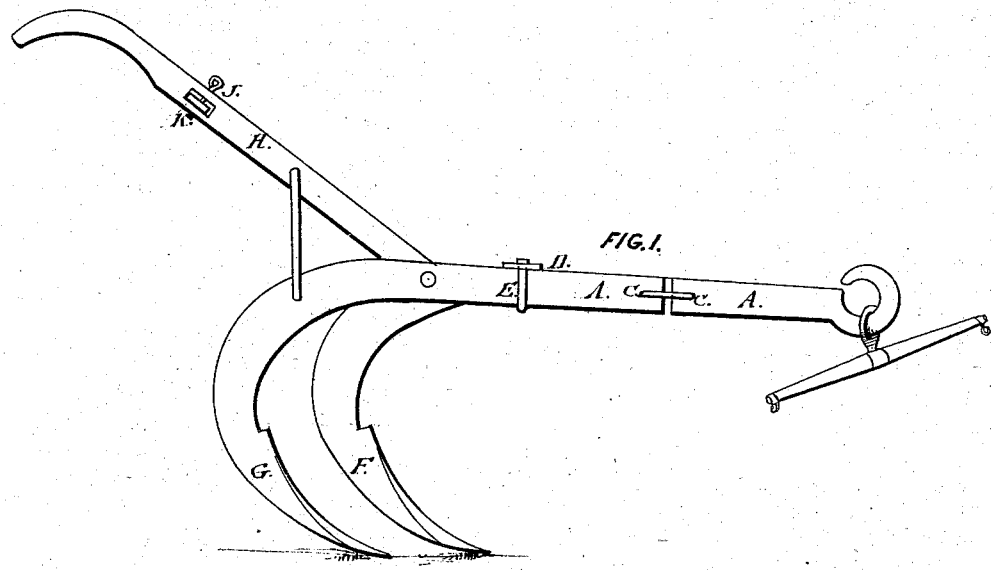
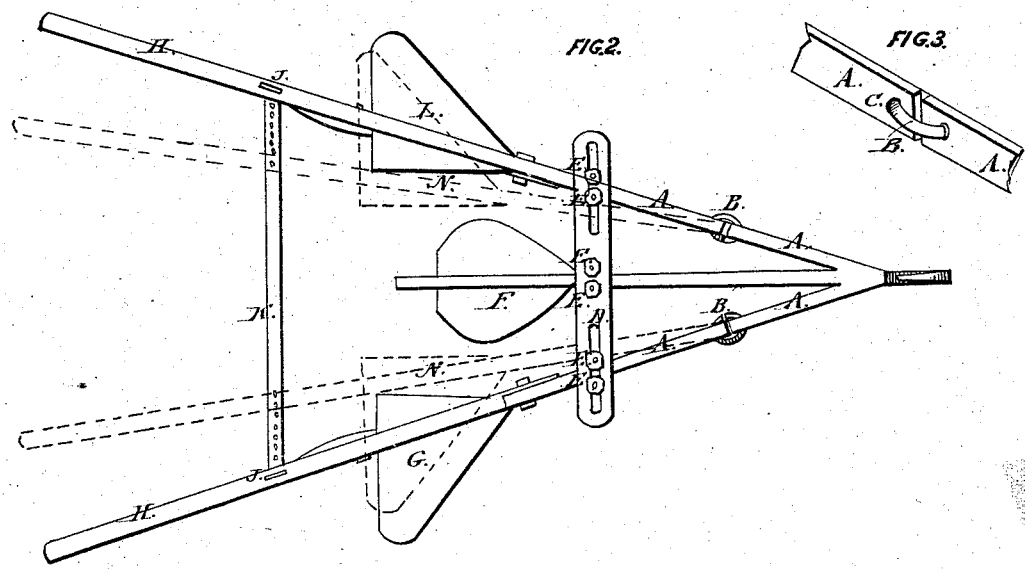
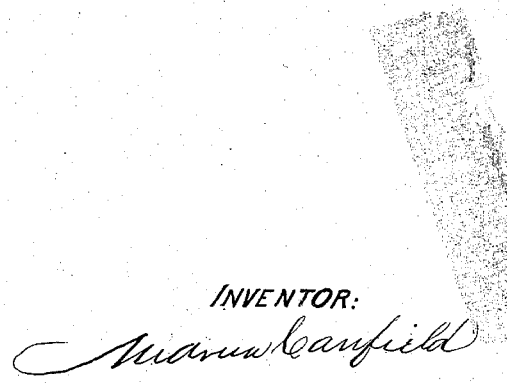
WITNESSES:
T. G. Petton
Jno. W. McLeod
INVENTOR:
Marvin Canfield

United States Patent Office.

ANDREW CANFIELD, OF LYONS, IOWA.

*Letters Patent No. 67,843, dated August 20, 1867.*

IMPROVEMENT IN CORN-PLOUGHS.

*The Schedule referred to in these Letters Patent and making part of the same.*

TO ALL WHOM IT MAY CONCERN:

Be it known that I, A. CANFIELD, of Lyons, Clinton county, and State of Iowa, have invented a new and useful Improvement in One-Horse Corn-Ploughs; and I do hereby declare that the following is a full and exact description thereof, reference being had to the accompanying drawings and to the letters of reference marked thereon.

The nature of my invention consists in so constructing an iron one-horse corn-plough that it may be adjusted to any required width for convenience of working among corn; also to be so arranged as to admit of hilling up the corn or turning the earth from it. A further convenience I have arranged; that is, to change the number of shovels at will, making the plough one, two, or three shovels, thereby adjusting it to the amount of work to be performed.

To enable others to make and use my invention, I will proceed to describe its construction and its operation.

I construct the beam of iron in the usual manner, but having a joint at B B. This joint is made with an open link, as shown at B, Figures 1, 2, and 3. I construct a slotted bar fitted with clamps, as shown at D, and also a stay-bar, K; these are to confine the movable beams to any angle, as shown by the dotted lines N. I attach the shovels G F L, also the handles H, in the ordinary manner, claiming no patent therefor.

Now the operation of this adjustable one-horse corn-plough will at once be seen by examining its parts. I will, however, carefully describe the same that it may be the more readily understood.

Now if it be desired to set the shovels wide to hill up the corn, I put the outside shovels L and G so that the angle of the shovel will cast the earth towards the corn. Then put in the open link B B, lay on the bar D, put on the clamps E E through the slot M M, and firmly tighten by turning down the nuts in said clamps. I insert the stay-bar K into a mortise in the handle H H, and then through holes in handle and bar insert the pins J. Now it will be seen that these bars effectually and firmly hold the shovels to their places. If I wish to narrow the plough loosen the clamps E E, and remove the pins J J, I bring the beams A A toward each other to the required width, tighten the nuts, insert the pins J J, and it is done. If I wish to cast the earth from the corn, I just loosen the clamp E E, remove the pins J J and the open links B B, and change the beams, setting the shovels so that the angle or mould-board will cast the earth from the corn, readjust the clamp and pins, and the change is made quickly and effectually.

What I claim as my invention, and desire to secure by Letters Patent, is—

The adjustable beams A A, with joint at B, and the open link C. Also the slotted bar D, with the clamps E E, when constructed, arranged, and operating substantially as and for the purposes above set forth and described.

ANDREW CANFIELD.

Witnesses:
T. G. PETTON,
JNO. W. McLEOD.